(12) United States Patent
Inagaki et al.

(10) Patent No.: US 9,390,830 B2
(45) Date of Patent: *Jul. 12, 2016

(54) CONDUCTIVE PASTE FOR SCREEN PRINTING

(75) Inventors: Shou Inagaki, Sakura (JP); Hideki Etori, Sakura (JP); Hiroshi Isozumi, Kita-ku (JP); Masanori Kasai, Nerima-ku (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/499,022

(22) PCT Filed: Dec. 21, 2010

(86) PCT No.: PCT/JP2010/072948
§ 371 (c)(1),
(2), (4) Date: Aug. 3, 2012

(87) PCT Pub. No.: WO2011/078140
PCT Pub. Date: Jun. 30, 2011

(65) Prior Publication Data
US 2013/0056687 A1  Mar. 7, 2013

(30) Foreign Application Priority Data
Dec. 22, 2009  (JP) .................. 2009-290510

(51) Int. Cl.
*H01B 1/02* (2006.01)
*H01B 1/22* (2006.01)
*B22F 1/00* (2006.01)
*B82Y 30/00* (2011.01)
*C09D 11/03* (2014.01)
*C09D 11/037* (2014.01)
*C09D 11/52* (2014.01)

(52) U.S. Cl.
CPC ............. *H01B 1/22* (2013.01); *B22F 1/0018* (2013.01); *B22F 1/0074* (2013.01); *B82Y 30/00* (2013.01); *C09D 11/03* (2013.01); *C09D 11/037* (2013.01); *C09D 11/52* (2013.01); *H01B 1/02* (2013.01)

(58) Field of Classification Search
CPC .......................................... H01B 1/02
USPC ........................................... 252/512
See application file for complete search history.

(56) References Cited

U.S. PATENT DOCUMENTS

| 5,011,627 A * | 4/1991 | Lutz et al. .............. 252/512 |
| 7,081,214 B2 * | 7/2006 | Matsuba et al. ........... 252/512 |
| 2004/0004209 A1 | 1/2004 | Matsuba et al. |
| 2008/0280402 A1 * | 11/2008 | Moriwaka ................ 438/164 |
| 2009/0198009 A1 * | 8/2009 | Matsuki et al. ............ 524/440 |

FOREIGN PATENT DOCUMENTS

| JP | 2006-026602 A | 2/2006 |
| JP | 2006-213887 A | 8/2006 |
| JP | 2008-091250 A | 4/2008 |
| JP | 2009-097074 A | 5/2009 |
| WO | 02/35554 A1 | 5/2002 |
| WO | 2008/143061 A1 | 11/2008 |

OTHER PUBLICATIONS

International Search Report of PCT/JP2010/072948, mailing date Feb. 8, 2011.

* cited by examiner

*Primary Examiner* — Harold Pyon
*Assistant Examiner* — William Young
(74) *Attorney, Agent, or Firm* — Westerman, Hattori, Daniels & Adrian, LLP

(57) ABSTRACT

There is provided a conductive paste for screen printing. The conductive paste includes: metal nanoparticles (Y) having a surface coated with a polymer compound having a branched polyalkyleneimine chain and a polymer chain selected from the group consisting of a polyoxyalkylene chain, a polymer chain composed of a polyvinyl alcohol, a polymer chain composed of a water-soluble poly(meth)acrylic acid, a polyacylalkyleneimine chain, and a polymer chain composed of a polyacrylamide; an aliphatic monocarboxylic acid having 6 to 10 carbon atoms and/or succinic anhydride; and an organic solvent (B). A polyalkylene glycol is used as the organic solvent (B).

7 Claims, No Drawings

CONDUCTIVE PASTE FOR SCREEN PRINTING

TECHNICAL FIELD

The present invention relates to a conductive paste for screen printing, capable of being baked at a low temperature of 150° C. or lower and being printed on a plastic substrate that cannot be subjected to printing at high temperatures.

BACKGROUND ART

Recently, in order to keep up with the age of ubiquitous electronic devices, a technique that can realize high-density mounting (fine-circuit formation) at a low cost has been desired in the production of circuit wiring of electronic devices. A known example of such a technique is a method for forming conductive wiring, the method including printing a silver paste containing, as a component, silver particles having a nanometer size (hereinafter referred to as "nano-silver") by a screen printing method to form a fine pattern, and then baking the silver paste at a low temperature of 150° C. or lower.

A printing method can provide inexpensive circuit wiring because of a reduction in the number of processes and the high throughput property thereof. In addition, if low-temperature baking at 150° C. or lower can be realized, it will be possible to use, as a substrate material that is an alternative to expensive polyimides which have been used to date, commodity plastics, such as polyethylene terephthalate (PET) and polyethylene naphthalate (PEN), which are inexpensive and have low heat resistance but are easily formed into a thin film, i.e., easily molded into a flexible film. Furthermore, the use of the silver paste containing nano-silver can realize highly fine patterning, and will contribute to the realization of high-density mounting. This is because an existing silver paste containing silver having a micrometer size may clog a screen mesh having a fine pitch necessary for highly fine printing, whereas the silver paste containing nano-silver does not have such a drawback.

Under these circumstances, various conductive pastes for printing have been proposed. Various conductive pastes for screen printing containing metal nanoparticles protected by a polymer compound containing a basic nitrogen atom, a deprotecting agent for the metal nanoparticles, and an organic solvent are known as conductive pastes for screen printing.

For example, Patent Literature 1 discloses a silver paste in which nano-silver having an average particle diameter of 0.1 μm or less is used as a silver component. However, it is necessary to bake this silver paste at 200° C. or higher in order to achieve a volume resistance of $10^{-5}$ Ωcm. Thus, it is difficult to print this silver paste on a plastic substrate having insufficient heat resistance.

Furthermore, Patent Literature 2 discloses a technique in which the baking temperature is decreased by irradiating of energy rays before a baking step. However, this technique has a problem in that a plastic substrate is degraded by the energy rays.

Thus, a conductive paste is not yet known with which circuit wiring having a lower volume resistance value can be formed on a plastic substrate having lower heat resistance and lower durability to energy rays, by low-temperature baking.

CITATION LIST

Patent Literature

PTL 1: International Publication No. WO2002/035554
PTL 2: Japanese Unexamined Patent Application Publication No. 2006-26602

SUMMARY OF INVENTION

Technical Problem

An object of the present invention is to provide a metal paste that can be screen-printed using a fine-pitched screen mesh to form a fine circuit pattern and that can form circuit wiring having a lower resistance by low-temperature baking, using a nano-metal as a metal component.

Solution to Problem

As a result of intensive studies conducted in view of the above circumstances, the inventors of the present invention found the following: In an existing conductive paste containing metal nanoparticles (Y) protected by an organic compound (X) containing a basic nitrogen atom, a deprotecting agent (A) for the metal nanoparticles, and an organic solvent (B), an aliphatic monocarboxylic acid having 6 to 10 carbon atoms and/or an unsubstituted aliphatic dicarboxylic anhydride is used as the deprotecting agent (A) for the metal nanoparticles, and a polyalkylene glycol is used as the organic solvent (B). In this case, the resulting conductive paste does not dissolve or swell commodity plastics (low activity), and can be printed by a screen printing method without degrading the working environment because of the lower odor and lower toxicity thereof. In addition, the organic solvent contained in the conductive paste volatilizes at a lower temperature than that in existing conductive pastes. Thus, circuit wiring that has an excellent surface smoothness and that exhibits a low resistance can be formed even when baking is performed at a lower temperature than that for existing conductive pastes. This finding resulted in completion of the present invention.

Specifically, the present invention provides a conductive paste for screen printing containing metal nanoparticles (Y) protected by an organic compound (X) containing a basic nitrogen atom, a deprotecting agent (A) for the metal nanoparticles, and an organic solvent (B), wherein an aliphatic monocarboxylic acid having 6 to 10 carbon atoms and/or an unsubstituted aliphatic dicarboxylic anhydride is used as the deprotecting agent (A) for the metal nanoparticles, and a polyalkylene glycol is used as the organic solvent (B).

Advantageous Effects of Invention

According to the conductive paste for screen printing of the present invention, the optimum monocarboxylic acid and dicarboxylic anhydride that can remove an organic compound containing a basic nitrogen atom from the surfaces of metal nanoparticles even at a lower temperature are selected from existing deprotecting agents. In addition, the optimum organic solvent that volatilizes at a lower temperature than organic solvents used in existing conductive pastes, that can be used also in a screen printing method, and that does not corrode a plastic constituting a substrate is selected from existing organic solvents. The conductive paste for screen printing of the present invention is prepared by using these deprotecting agent and organic solvent in combination. Accordingly, the conductive paste does not dissolve or swell commodity plastics (has a low activity), and can be printed by a screen printing method without degrading the working environment because of the lower odor and lower toxicity thereof. In addition, the organic solvent contained in the conductive paste volatilizes at a lower temperature than that in existing conductive pastes. Thus, circuit wiring that exhibits a low resistance can be formed even when baking is performed at a lower temperature than that for existing conductive pastes. Accordingly, the conductive paste for screen printing of the present invention has the above-described remarkable technical advantages.

DESCRIPTION OF EMBODIMENTS

The details of the present invention will now be described.

The present invention provides a conductive paste for screen printing, the conductive paste containing metal nanoparticles (Y) protected by an organic compound (X) containing a basic nitrogen atom, a deprotecting agent (A) for the metal nanoparticles, and an organic solvent (B), wherein an aliphatic monocarboxylic acid having 6 to 10 carbon atoms and/or an unsubstituted aliphatic dicarboxylic anhydride is used as the deprotecting agent (A) for the metal nanoparticles, and a polyalkylene glycol is used as the organic solvent (B).

The metal nanoparticles (Y) protected by an organic compound (X) containing a basic nitrogen atom include an organic compound (X) containing a basic nitrogen atom and metal nanoparticles (Y), and the surfaces of the metal nanoparticles (Y) are coated and protected by the organic compound (X) containing a basic nitrogen atom. In this state, the metal nanoparticles (Y) are not exposed, because the organic compound (X) containing a basic nitrogen atom forms an insulating layer. Therefore, when the paste is simply applied at room temperature, although a continuous coating film is formed, the film does not exhibit conductivity. However, at a certain temperature, the organic compound (X) containing a basic nitrogen atom, with which the metal nanoparticles (Y) are covered, reacts with the deprotecting agent (A) described below. Consequently, the metal nanoparticles (Y) are exposed and then fused, thereby exhibiting conductivity.

Known, common metal nanoparticles can be used as such metal nanoparticles (Y) protected by an organic compound (X) containing a basic nitrogen atom. Examples of the metal nanoparticles (Y) include particles of a metal such as gold, silver, copper, or platinum. However, metal nanoparticles having an average particle diameter of 1 to 50 nm are preferable because a fine pattern can be formed, a resistance value after baking can be decreased, and circuit wiring having an excellent surface smoothness can be formed as compared with the case where similar micro-meter metal particles are used. Among these, silver nanoparticles are particularly preferable because a metal ion thereof is coordinated with polyethyleneimine, which is the most suitable polymer compound containing a basic nitrogen atom described below, and is then easily reduced in the presence of an appropriate reducing agent at room temperature or in a heated state.

Herein, the term "average particle diameter" refers to a value represented by a volume average particle diameter measured by a dynamic light-scattering method after particles are diluted with a good dispersion solvent. For example, in the case of silver nanoparticles having an average particle diameter of 1 to 50 nm and protected by an organic compound containing a basic nitrogen atom, the good dispersion solvent is water. For this measurement, Nanotrac UPA-150 manufactured by Microtrac, Inc. can be used.

As the organic compound (X) containing a basic nitrogen atom, a low-molecular organic compound such as a monoalkylamine having a primary amino group, e.g., dodecylamine, or a polyoxyalkyleneamine may be used. However, from the standpoint of reliably protecting the metal nanoparticles (Y), a high-molecular organic compound (hereinafter referred to as "polymer compound") is preferably used. As such a polymer compound containing a basic nitrogen atom, a polymer compound having a polyalkyleneimine chain (a) and a hydrophilic segment (b), as described in, for example, International Publication No. WO2008/143061 is the most suitable.

In the present invention, an example of the most suitable polymer compound described above is a polymer compound having a polyalkyleneimine chain (a). An imino structure has a basic nitrogen atom, and an alkyleneimine unit in the polyalkyleneimine chain (a) can be coordinately bonded to a metal or a metal ion, and thus the polyalkyleneimine chain is a polymer chain that can immobilize a metal as nanoparticles. The polymer compound has a polymer structure having an alkyleneimine unit of a secondary amine as a main repeating unit, and may have a straight-chain structure or a branched structure.

In the case where the diameter of the polymer compound is decreased in order to improve dispersion stability of the conductive paste, a branched structure is preferable.

The degree of polymerization of the polyalkyleneimine chain (a) is not particularly limited. However, from the standpoint of the capability of immobilizing metal nanoparticles and the prevention of an excessive growth of the particle diameter at the time of dispersion, the degree of polymerization of the polyalkyleneimine chain (a) is usually in the range of 1 to 10,000, preferably in the range of 3 to 3,000, and more preferably in the range of 5 to 1,000.

Any polyalkyleneimine chain that is generally commercially available or that can be generally synthesized can be used as the polyalkyleneimine chain (a) without particular limitations. From the standpoint of industrial availability etc., the polyalkyleneimine chain (a) is preferably a polyethyleneimine chain or a polypropyleneimine chain.

The hydrophilic segment (b) constituting the polymer compound used in the present invention is a segment that has a high affinity with a hydrophilic solvent in the case where the polymer compound is dispersed in the hydrophilic solvent such as water and that maintains dispersion stability when a dispersion is formed. In the case where the polymer compound is dispersed in a hydrophobic solvent, the hydrophilic segment (b) has a function of forming a core of a dispersion due to a strong intra- or intermolecular association force of the hydrophilic segment (b). The degree of polymerization of the hydrophilic segment (b) is not particularly limited. However, from the standpoint of ensuring dispersion stability and preventing aggregation in the case of dispersing in a hydrophilic solvent, and from the standpoint of ensuring a high association force and affinity with a hydrophobic solvent in the case of dispersing in the hydrophobic solvent, the degree of polymerization of the hydrophilic segment (b) is usually 1 to 10,000, preferably 3 to 3,000. From the standpoint of the ease of production method etc., the degree of polymerization of the hydrophilic segment (b) is more preferably 5 to 1,000. Furthermore, when the hydrophilic segment (b) is a polyoxyalkylene chain, the degree of polymerization is particularly preferably 5 to 500.

Any hydrophilic polymer chain that is generally commercially available or that can be generally synthesized can be used as the hydrophilic segment (b) without particular limitations. In particular, because a dispersion having excellent stability is obtained in a hydrophilic solvent, a segment composed of a nonionic polymer is preferable for the hydrophilic segment (b).

Examples of the hydrophilic segment (b) include polyoxyalkylene chains such as a polyoxyethylene chain and a polyoxypropylene chain; polymer chains composed of a polyvinyl alcohol such as polyvinyl alcohol or partially saponified polyvinyl alcohol; polymer chains composed of a water-soluble poly(meth)acrylic acid ester such as polyhydroxyethyl acrylate, polyhydroxyethyl methacrylate, dimethylaminoethyl acrylate, or dimethylaminoethyl methacrylate; polyacylalkyleneimine chains having a hydrophilic substituent, such as polyacetylethyleneimine, polyacetylpropyleneimine, polypropionylethyleneimine, and polypropionylpropyleneimine; and polymer chains composed of a polyacrylamide such as polyacrylamide, polyisopropylacrylamide, or polyvinylpyrrolidone. Among these, from the standpoint of obtaining a dispersion having a particularly excellent stability and the ease of industrial availability, polyoxyalkylene chains are preferable.

The metal nanoparticles protected by a polymer compound containing a basic nitrogen atom may be metal nanoparticles (Y) protected by a polymer compound further having a hydrophobic segment (c) in addition to the polyalkyleneimine chain (a) and the hydrophilic segment (b).

The hydrophobic segment (c) constituting the polymer compound that is preferably used in the present invention has a function of forming a core of a dispersion due to a strong intra- or intermolecular association force and forming a stable dispersion in the case where the polymer compound is dispersed in a hydrophilic solvent such as water. In the case where the polymer compound is dispersed in a hydrophobic solvent, the hydrophobic segment (c) has a strong affinity with the solvent and maintains dispersion stability when a dispersion is formed.

Any residue of a hydrophobic compound that is generally commercially available or that can be generally synthesized can be used as the hydrophobic segment (c) without particular limitations. Examples thereof include residues of polymers of polystyrenes such as polystyrene, polymethylstyrene, polychloromethylstyrene, and polybromomethylstyrene; residues of water-insoluble poly(meth)acrylic acid esters such as polymethylacrylate, polymethylmethacrylate, poly(2-ethylhexyl acrylate), and poly(2-ethylhexyl methacrylate); and residues of polyacylalkyleneimines polymer having a hydrophobic substituent, such as polybenzoylethyleneimine, polybenzoylpropyleneimine, poly(meth)acryloylethyleneimine, poly(meth)acryloylpropyleneimine, poly[N-{3-(perfluorooctyl)propionyl}ethyleneimine], and poly[N-{3-(perfluorooctyl)propionyl}propyleneimine; and residues of resins such as epoxy resins, polyurethanes, and polycarbonates. Each of these residues may be a residue of a single compound or may be a residue of a compound obtained by allowing two or more different types of compounds to react with each other in advance.

Among the hydrophobic segments (c) cited above, a residue of an epoxy resin is the most suitable hydrophobic segment from the comprehensive consideration of not only the ease of industrial availability and handleability of a compound used as a raw material but also a high hydrophobic association force when the hydrophobic segment is present in the polymer compound (X), etc.

The degree of polymerization of the hydrophobic segment (c) is not particularly limited. However, in the case where the polymer compound is dispersed in a hydrophilic solvent, from the standpoint of ensuring high dispersion stability and preventing aggregation at the time of dispersion, and in the case where the polymer compound is dispersed in a hydrophobic solvent, from the standpoint of maintaining high dispersibility and affinity with the solvent, the degree of polymerization of the hydrophobic segment (c) is usually 1 to 10,000. In the case of polystyrenes, poly(meth)acrylic acid esters, and polyacylalkyleneimines having a hydrophobic substituent, the degree of polymerization is preferably 3 to 3,000, and more preferably 10 to 1,000. In the case where the hydrophobic segment (c) is composed of a residue of resins such as epoxy, polyurethanes, and polycarbonates, the degree of polymerization is usually 1 to 50, preferably 1 to 30, and particularly preferably 1 to 20.

A method for producing the above most suitable polymer compound used in the present invention is not particularly limited.

As described above, a commercially available or synthesized product can be used as the branched polyalkyleneimine chain.

A typical synthesis example of the polymer compound will be described. (I) A commercially available product is used as a branched polyalkyleneimine, and a tosyl product of polyethylene glycol monomethyl ether is used as a hydrophilic polymer. The hydrophilic polymer can be obtained by, for example, allowing polyethylene glycol monomethyl ether and tosyl chloride to react with each other in a polar solvent in the presence of pyridine. In the case where a hydrophobic polymer is further used, an epoxy resin having an epoxy group at an end thereof is used as the hydrophobic polymer. In the case of this combination, first, polyethyleneimine is dissolved in a polar solvent, and is allowed to react with the tosyl product of polyethylene glycol monomethyl ether at 100° C. in the presence of a base such as potassium carbonate to synthesize a compound having a structure of polyethylene glycol and polyethyleneimine. Subsequently, in a mixed solvent of acetone and methanol, the epoxy resin is added to the compound, and the resulting solution is allowed to react at 60° C. Thus, a polymer compound having a structure of polyethylene glycol-polyethyleneimine-epoxy resin can be obtained.

As for the proportion of respective components in the polymer compound, for example, in the case of a ternary system including a polyethyleneimine chain, a proportion (a):(b):(c) of the degree of polymerization of polymers constituting chains of respective components of the polyalkyleneimine chain (a), the hydrophilic segment (b), and the hydrophobic segment (c) is not particularly limited. However, from the standpoint of an excellent association force, dispersion stability, and storage stability of the resulting metal nanoparticle dispersion, the proportion is usually in the range of 5,000:5 to 5,000,000:1 to 5,000,000.

The metal nanoparticles (Y) protected by an organic compound (X) containing a basic nitrogen atom are preferably prepared so that the content of the organic compound (X) is in the range of 1% to 5% relative to the metal nanoparticles (Y) on the basis of the mass of nonvolatile matter from the standpoint that a sufficient protection can be properly performed without contact between moisture or oxygen and the surfaces of the metal nanoparticles and without causing self-fusion between the metal nanoparticles, and that the amount of use of deprotecting agent (A) described below can be reduced.

The metal nanoparticles protected by an organic compound containing a basic nitrogen atom, which are most suitable in the present invention, can be easily obtained by adding a solution of a metal oxide or a metal ion to a medium in which a compound having a polyalkyleneimine chain and a hydrophilic segment is dispersed, and reducing the oxide or ion of the metal so that the metal stabilizes in the form of metal nanoparticles. A metal nanoparticle dispersion thus produced has excellent dispersion stability and a storage property, and potentially has an electrical property of the metal nanoparticles.

In preparation of a conductive paste suitable for a screen printing method, the metal nanoparticles (Y) protected by the organic compound (X) containing a basic nitrogen atom is incorporated in an amount of preferably 65% or more, and particularly preferably 70% to 90% on a nonvolatile matter mass basis. In order to improve a screen printability, it is effective to increase the nonvolatile content in the conductive paste. However, when another binder resin is used in combination for this purpose, not only does the nonvolatile content of the metal nanoparticles (Y) protected by the organic compound (X) containing a basic nitrogen atom in the conductive paste decrease, but also the added binder resin remains in the coating film, resulting in a decrease in the conductivity. Accordingly, the amount of binder resin used in combination as a third component is preferably minimized within a range in which the decrease in the conductivity can be accepted.

The metal nanoparticles (Y) protected by the organic compound (X) containing a basic nitrogen atom can be produced in any nonvolatile content in a liquid medium containing a polyalkylene glycol and other organic solvents which is incorporated in the conductive paste.

The metal nanoparticles (Y) protected by the organic compound (X) containing a basic nitrogen atom can be used as a dispersion in which the metal nanoparticles (Y) are dispersed in the above liquid medium. However, in the case of obtaining the above-described conductive paste of the present invention containing the metal nanoparticles (Y) protected by the organic compound (X) containing a basic nitrogen atom in an amount of 65% or more, it is not preferable to condense the dispersion that contains the metal nanoparticles (Y) protected with the organic compound (X) having a basic nitrogen atom in a low nonvolatile content. Instead, it is preferable to use a nonvolatile matter which can be obtained by removing the liquid medium from the dispersion by spray drying, freeze-drying, or the like. Regarding a dispersion prepared by dispersing the metal nanoparticles in a liquid medium in advance, the nonvolatile content of the dispersion can be increased by, for example, concentration. However, in this case, the stability of the dispersion decreases, and separation or aggregation may occur when the dispersion is used in the form of a conductive paste. In contrast, by using the metal nanoparticles (Y) protected by the organic compound (X) containing a basic nitrogen atom and containing no liquid medium, an excellent conductive paste can be obtained without impairing stability even in a high nonvolatile content, by simply diluting the metal nanoparticles (Y) so as to have a desired nonvolatile content.

The deprotecting agent (A) has a function of reacting with the organic compound (X) containing a basic nitrogen atom to expose the metal nanoparticles (Y) which are protected by the organic compound (X) containing a basic nitrogen atom.

When the metal nanoparticles (Y) protected by the organic compound (X) containing a basic nitrogen atom are baked at an appropriate temperature or higher, the organic compound (X) containing a basic nitrogen atom reacts with the deprotecting agent (A). Consequently, although the resulting reactant remains in a coating film, the metal nanoparticles (Y) themselves are exposed and then fused to each other, thereby forming a continuous metal coating film. Circuit wiring based on this coating film exhibits conductivity.

In the present invention, an aliphatic monocarboxylic acid having 6 to 10 carbon atoms and/or an unsubstituted aliphatic dicarboxylic anhydride is used as the deprotecting agent (A) for the metal nanoparticles. Examples of the aliphatic monocarboxylic acid having 6 to 10 carbon atoms include caproic acid, enanthic acid, caprylic acid, pelargonic acid, and capric acid. Examples of the unsubstituted aliphatic dicarboxylic anhydride include aliphatic dicarboxylic anhydrides that have no substituent in the alicyclic structure thereof, such as succinic anhydride, glutaric anhydride, and hexahydrophthalic anhydride. These may be used alone or in combination of two or more compounds.

Each of the aliphatic monocarboxylic acids having 6 to 10 carbon atoms and/or unsubstituted aliphatic dicarboxylic anhydrides is a deprotecting agent (A) having excellent features that have not been realized to date from the standpoint that these compounds do not react with the organic compound (X) containing a basic nitrogen atom at room temperature, do not easily volatilize at a heating temperature during baking, and have excellent miscibility with the organic compound (X) containing a basic nitrogen atom and the metal nanoparticles (Y), and thus it is possible to obtain a conductive paste having excellent dispersion stability without separation, aggregation, precipitation, and the like, and furthermore, even if these compounds remain in a coating film, a dry coating film can be obtained.

In preparation of the conductive paste of the present invention, on a mass basis, the deprotecting agent (A) is preferably used in an amount of 0.05 to 40 moles per mole of a basic nitrogen atom in the organic compound (X) containing the basic nitrogen atom. From the standpoint of achieving the maximum effect in the deprotection based on the reaction between a basic nitrogen atom and an acid group (or an acid anhydride group) and preventing a decrease in the conductivity due to the remaining of the deprotecting agent (A) itself in a coating film as much as possible, it is preferable to use the deprotecting agent (A) and the organic compound (X) containing a basic nitrogen atom at an appropriate ratio. From this standpoint, in particular, the deprotecting agent (A) is preferably used in an amount of 0.1 to 5 moles per mole of a basic nitrogen atom in the organic compound (X) containing the basic nitrogen atom on a mass basis.

In preparation of the conductive paste of the present invention, from the standpoint of achieving the maximum effect in the deprotection based on the reaction between a basic nitrogen atom and an acid group (or an acid anhydride group) and preventing a decrease in the conductivity due to the remaining of the deprotecting agent (A) itself in a coating film as much as possible, it is preferable to use the deprotecting agent (A) and the organic compound (X) containing a basic nitrogen atom at an appropriate ratio. From this standpoint, the deprotecting agent (A) is preferably used in an amount of 0.2 to 40 moles per mole of a basic nitrogen atom in the organic compound (X) containing the basic nitrogen atom on a mass basis.

The organic solvent (B) has a function of preparing a liquid containing the deprotecting agent (A) and the metal nanoparticles (Y) protected by the polymer compound (X) containing a basic nitrogen atom so as to apply the deprotecting agent (A) and the metal nanoparticles (Y) onto a substrate composed of various materials. In the present invention, it is assumed that not only inorganic materials and organic plastic materials having high heat resistance and high rigidity, such as glass, ceramics and polyimides, but also thermoplastics which have lower heat resistance and lower durability to energy rays and/or which can be easily formed into a thin film or a flexible film are used. Therefore, organic solvents which do not dissolve or swell these substrate materials, which volatilize at lower temperatures, which can realize baking at lower temperatures, and which do not significantly degrade the working environment because of their lower odor and lower toxicity are selected and used.

In the present invention, a polyalkylene glycol is used as such an organic solvent (B). Preferable examples of such a polyalkylene glycol include polyalkylene glycols that are a liquid at room temperature, such as diethylene glycol, triethylene glycol, tetraethylene glycol, dipropylene glycol, and tripropylene glycol. Among these, polyalkylene glycols that start to volatilize at about 150° C., such as triethylene glycol, are more preferable from the standpoint that these polyalkylene glycols are excellent in terms of preparation of a conductive paste for screen printing because these polyalkylene glycols do not easily volatilize due to their low vapor pressure at room temperature, these polyalkylene glycols have excellent miscibility with silver nanoparticles protected by a polymer compound containing a basic nitrogen atom, and thus separation or the like does not easily occur, these polyalkylene glycols do not dissolve or swell the various thermoplastics described above, these polyalkylene glycols can be removed by lower temperature baking, and the working environment does not significantly degrade because of the low odor and low toxicity of these polyalkylene glycols.

The organic solvent (B) is used in an amount of preferably 10 to 50 parts by mass, and from the standpoint of improving screen printability, more preferably 15 to 30 parts by mass per 100 parts by mass of the nonvolatile matter of the metal nanoparticles (Y) protected by the organic compound (X) containing a basic nitrogen atom.

The conductive paste for screen printing of the present invention can be prepared by, for example, stirring and dispersing the metal nanoparticles (Y) protected by the organic compound (X) containing a basic nitrogen atom, the deprotecting agent (A), and the organic solvent (B) under a shear stress.

From the standpoint of excellent screen printability, as described above, the conductive paste of the present invention is preferably prepared so that the metal nanoparticles (Y) protected by the organic compound (X) containing a basic nitrogen atom are contained in the paste in an amount of 65% or more, in particular 70% to 90% on the basis of the mass of nonvolatile matter.

The conductive paste for screen printing of the present invention may optionally contain known, common additives for improving printing properties and coating film properties, such as a defoaming agent, a surfactant, and a rheology adjusting agent in an amount that does not adversely affect the dispersion stability of the paste and the performance of a coating film after baking.

The conductive paste for screen printing of the present invention thus obtained is applied onto, for example, a thermoplastic substrate, such as a PET, PEN, or polycarbonate substrate, which has lower heat resistance and lower durability to energy rays and/or which can be easily formed into a thin film or a flexible film as compared with existing substrates, so as to correspond to circuit wiring, and is then baked at 150° C. or lower. Thus, a circuit wiring pattern based on the metal nanoparticles can be drawn on the substrate.

Not only do glass, ceramics, polyimides, and the like have high rigidity, and thus it takes a long time to form a thin-film substrate or a flexible substrate using these materials, but also these materials themselves are expensive. In contrast, not only are the above thermoplastics easily molded and thus it is easy to form a thin-film substrate or a flexible substrate using these thermoplastics, but also these thermoplastics are inexpensive. Therefore, these thermoplastics are suitable for reducing the weight and the size of a substrate. Accordingly, an electric/electronic component having a reduced weight or reduced size can be provided by forming circuit wiring on the above-described thermoplastic substrate which has low heat resistance and low durability to energy rays and/or which can be easily formed into a thin film or a flexible film, by using the conductive paste for screen printing of the present invention which can be baked at a temperature of 150° C. or lower, which is lower than the temperature for existing conducting pastes, without separate irradiation of energy rays, and with which a fine pattern having an excellent surface smoothness can be drawn, as compared with existing conductive pastes.

EXAMPLES

The present invention will now be described in more detail by way of Examples and Comparative Examples. In Examples and Comparative Examples described below, the units "part" and "%" are on a mass basis.

Production Example 1

A chloroform (30 mL) solution containing 9.6 g (50.0 mmol) of p-toluenesulfonyl chloride was added dropwise to a mixed solution containing 20.0 g (10.0 mmol) of methoxypolyethylene glycol [Mn=2,000], 8.0 g (100.0 mmol) of pyridine, and 20 mL of chloroform in a nitrogen atmosphere over a period of 30 minutes while stirring under cooling with ice. After the completion of the dropwise addition, stirring was further conducted for four hours at a bath temperature of 40° C. After the completion of the reaction, the reaction mixture was diluted by adding 50 mL of chloroform. Subsequently, the reaction mixture was sequentially washed with 100 mL of a 5% aqueous hydrochloric acid solution, 100 mL of an aqueous saturated sodium hydrogencarbonate solution, and 100 mL of a saturated aqueous saline solution, then dried with magnesium sulfate, filtered, and concentrated under reduced pressure. The resulting solid was washed with hexane several times, then filtered, and dried at 80° C. under reduced pressure. Thus, 22.0 g of a tosylated product was obtained. Next, 5.39 g (2.5 mmol) of this compound, 20.0 g (0.8 mmol) of branched polyethyleneimine (manufactured by Aldrich, molecular weight 25,000), 0.07 g of potassium carbonate, and 100 mL of N,N-dimethylacetamide were stirred at 100° C. for six hours in a nitrogen atmosphere. To the resulting reaction mixture, 300 mL of a mixed solution of ethyl acetate and hexane (V/V=1/2) was added. The mixture was vigorously stirred at room temperature, and a solid of the resulting product was filtered. The solid was repeatedly washed with 100 mL of a mixed solution of ethyl acetate and hexane (V/V=1/2) twice, and then dried under reduced pressure. Thus, 24.4 g of a solid of a polymer 1 in which a polyoxyethylene chain was bonded to branched polyethyleneimine was obtained as a polymer compound (X) having a polyalkyleneimine chain (a) and a hydrophilic segment (b).

Next, 58.8 g of an aqueous solution containing 0.296 g of this polymer 1 was added to 5.0 g of silver oxide, and the mixture was stirred at 25° C. for 30 minutes. Subsequently, 33.6 g of ethylenediamine was gradually added thereto under stirring. As a result, the color of the reaction solution changed to blackish brown, and some heat was generated. However, the reaction solution was left to stand and stirred at 25° C. for 30 minutes. Subsequently, 7.6 g of a 10% aqueous ascorbic acid solution was gradually added under stirring. Stirring was further continued for 20 hours while maintaining the temperature to obtain a dispersion of a blackish brown, silver-containing nanostructure. This dispersion was rapidly frozen at about −30° C. Furthermore, the pressure was reduced so that drying was performed by sublimating the solvent in a vacuum state, thus obtaining a freeze-dried product of silver nanoparticles protected by the polymer 1 in which a polyoxyethylene chain was bonded to branched polyethyleneimine (nonvolatile content: 92%). This freeze-dried product contained silver nanoparticles having an average particle diameter in the range of 1 to 50 nm measured using water as a good dispersion solvent.

Example 1

First, 255 g of the freeze-dried product of the silver nanoparticles protected by the polymer 1 in which a polyoxyethylene chain was bonded to a branched polyalkylimine chain, the freeze-dried product being obtained in Production Example 1 above, 45 g of triethylene glycol (hereinafter abbreviated as "TEG"), and 7 g of succinic anhydride were dispersed and mixed with a Hoover automatic muller to prepare a conductive silver paste.

This silver paste was screen-printed on a glass substrate using a 400-mesh screen to form a pattern having a strip shape with a size of 1 cm×3 cm, and then baked at 150° C. for 30 minutes in an oven.

Screen printability was evaluated by observing whether or not the coating film on the substrate after baking was a continuous film having an excellent surface smoothness, using a scanning electron microscope (SEM) at a magnification of 30,000.

The conductivity of the coating film on the substrate after baking was evaluated by measuring a resistance value by a four-probe method.

Example 2

A conductive silver paste was produced as in Example 1 except that 7 g of succinic anhydride in Example 1 was changed to 10 g of caprylic acid. The screen printability and the conductivity were then evaluated as in Example 1.

Comparative Example 1

The freeze-dried product of the silver nanoparticles protected by the polymer compound having a polyalkylimine chain and a hydrophilic segment, the freeze-dried product being obtained in Production Example 1 above, was mixed with water using a paint conditioner so that a mixing ratio of the freeze-dried product to water was 45%, to prepare a conductive silver paste containing the silver nanoparticles.

This silver paste was screen-printed on a glass substrate using a 400-mesh screen to form a pattern having a strip shape with a size of 1 cm×3 cm. The result is that the pattern blurred, and thus it was found that this silver paste did not have the screen printability. A film of the nano-silver was formed by spin coating and then baked at 150° C. for 30 minutes in an oven. The volume resistance of the film was measured.

Comparative Example 2

The screen printability and the conductivity were evaluated as in Example 1 except that succinic anhydride was not incorporated.

Comparative Example 3

Experimental Example Corresponding to Patent Literature 1

A conductive silver paste was produced as in Example 1 except that 7 g of succinic anhydride in Example 1 was changed to 15 g of nonenylsuccinic anhydride. The screen printability the conductivity were then evaluated as in Example 1.

Table 1 shows evaluation results of Examples 1 to 2 and Comparative Examples 1 to 3

TABLE 1

| | Example 1 | Example 2 | Comparative Example 1 | Comparative Example 2 | Comparative Example 3 |
|---|---|---|---|---|---|
| Solvent | TEG | TEG | Water | TEG | TEG |
| Mixing ratio[1] | 76.4 | 75.7 | 41.4 | 78.2 | 74.5 |
| Deprotecting agent | Succinic anhydride | Caprylic acid | None | None | Nonenylsuccinic anhydride |
| Screen printability | Good | Good | Poor | Good | Poor |
| Volume resistivity of coating film after baked at 150° C. (Ωcm) | $1.1 \times 10^{-5}$ | $2.8 \times 10^{-5}$ | $8.0 \times 10^{-4}$ | $8.1 \times 10^{-4}$ | Conductivity was not exhibited. |

Note
[1] The nonvolatile content of silver nanoparticles protected by a polymer compound having a polyalkylimine chain and a hydrophilic segment, in the conductive silver paste.

As is apparent from the comparison between Examples 1 and 2 and Comparative Examples 1 to 3, the conductive pasts of the present invention have the screen printability and can be baked at a lower temperature without application of energy rays, and as a result, the resulting coating film after baking has an excellent surface smoothness, and it is possible to draw a circuit wiring pattern whose resistance is lower than that of existing conductive pastes and which has excellent conductivity.

In Examples above, the results of experiments each conducted using a glass substrate have been described. However, it was also confirmed that even when a commercially available PEN film was used, substantially the same circuit wiring pattern could be drawn without degradation of the film.

The above conductive pastes of Examples did not dissolve or swell a commodity plastic (had a low activity), and can be printed by a screen printing method without degrading the working environment because of their lower odor and lower toxicity. In addition, the organic solvent in the conductive pastes volatilized at a lower temperature than that of existing conductive pastes. Thus, it was possible to form circuit wiring that exhibited a low resistance even when baking was performed at a lower temperature than that for existing conductive pastes.

INDUSTRIAL APPLICABILITY

The conductive paste of the present invention is prepared by using metal nanoparticles as a metal component, and combining a specific deprotecting agent with a specific organic solvent. Accordingly, the conductive paste can be screen-printed using a screen mesh having a fine pitch and is capable of forming a fine circuit. In addition, circuit wiring having a lower electrical resistance can be formed by baking at a low temperature even on a commodity plastic substrate having low heat resistance and low durability to energy rays.

The invention claimed is:
1. A method to produce a circuit pattern by using a conductive paste for screen printing, comprising;
providing the conductive paste, wherein the conductive paste comprises:
metal nanoparticles (Y) having a surface coated with a polymer compound having a branched polyalkyleneimine chain and a polymer chain selected from the group consisting of a polyoxyalkylene chain, a polymer chain composed of a polyvinyl alcohol, a polymer chain composed of a water-soluble poly(meth) acrylic acid, a polyacylalkyleneimine chain having a hydrophilic substituent, and a polymer chain composed of a polyacrylamide;

an aliphatic monocarboxylic acid having 6 to 10 carbon atoms and/or succinic anhydride; and an organic solvent (B), wherein a polyalkylene glycol is used as the organic solvent (B), wherein a nonvolatile content of the metal nanoparticles (Y) is 70% to 90% on a mass basis in the conductive past, printing the conductive paste on a substrate, and baking the conductive paste at a temperature of 150° C. or lower to form a circuit pattern having a resistivity on the order of $10^{-5}$ Ωcm.

2. The method according to claim 1, wherein the aliphatic monocarboxylic acid having 6 to 10 carbon atoms and/or succinic anhydride is caprylic acid and/or succinic anhydride.

3. The method according to claim 1, wherein the polyalkylene glycol is triethylene glycol.

4. The method according to claim 1, wherein the circuit pattern is included in an electric or electronic component.

5. The method according to claim 2, wherein the circuit pattern is included in an electric or electronic component.

6. The method according to claim 3, wherein the circuit pattern is included in an electric or electronic component.

7. The method according to claim 1, wherein the substrate is a flexible substrate made of polyethylene terephthalate, polyethylene naphthalate or polycarbonate.

\* \* \* \* \*